United States Patent Office 3,532,512
Patented Oct. 6, 1970

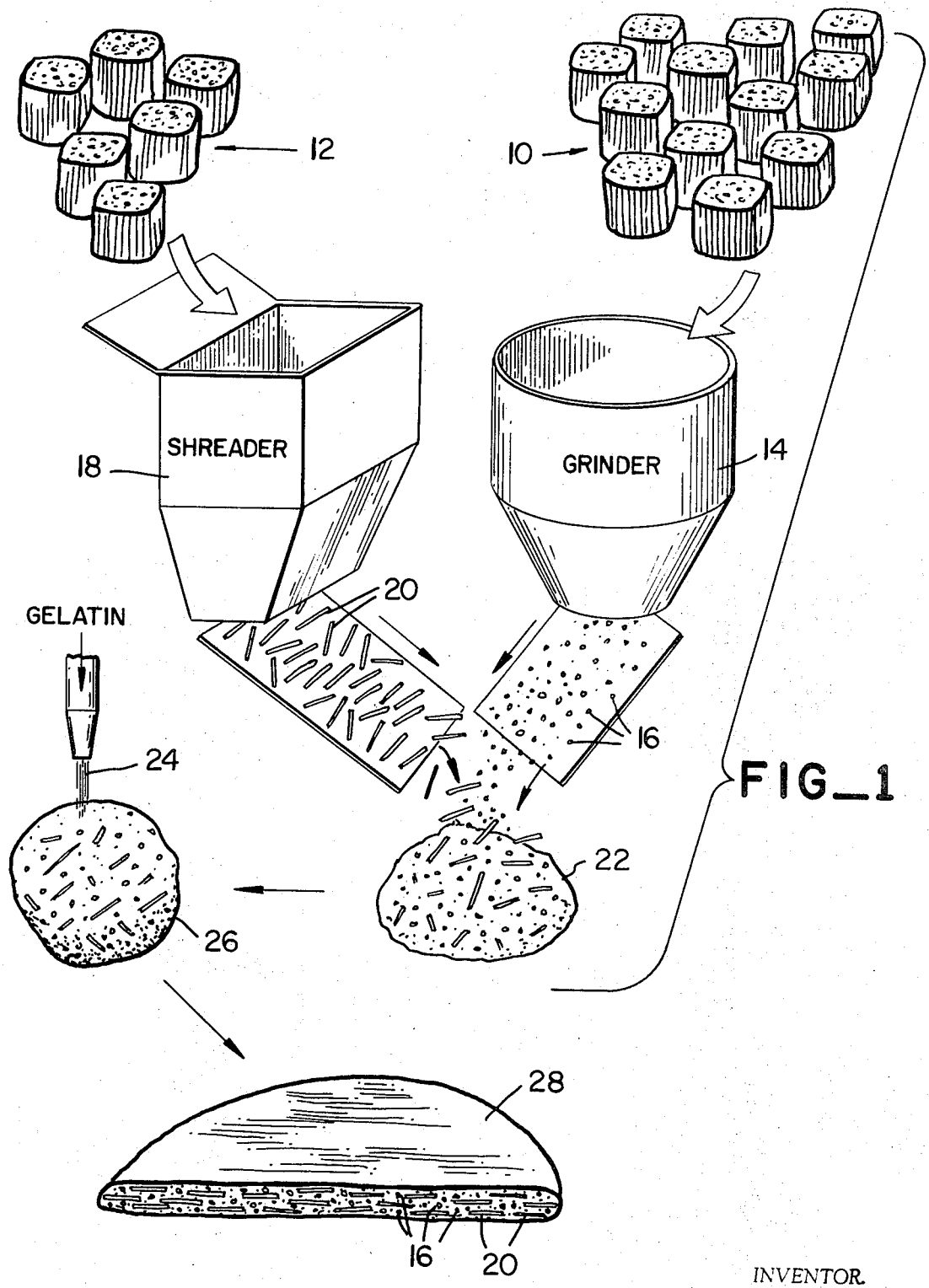

3,532,512
SEAFOOD PRODUCT AND METHOD
OF MAKING SAME
Jean Joaquin, Fairfax, Calif.
(2 Niven Way, Larkspur, Calif. 94939)
Filed Mar. 16, 1967, Ser. No. 623,693
Int. Cl. A22c 29/00; A23l 1/04, 1/33
U.S. Cl. 99—111          7 Claims

ABSTRACT OF THE DISCLOSURE

A unique seafood product closely resembling abalone is made by combining two portions of raw scallops, one of which is ground and the other of which is shredded into its natural muscle fibers. The mixed scallops are combined with a quantity of animal gelatin and flattened to a uniform thickness.

---

This invention relates to food products and more particularly to a unique seafood product and a method for making the product.

Amongst gourmets abalone steak is well known for its distinctively delicate flavor. However, it is also widely known that abalone is difficult even for culinary experts to prepare with optimum results, and unless properly pretenderized and cooked in just the right manner, it will become tough and unpalatable. In addition to these inherent difficulties, the availability of abalone decreased rapidly in recent years and became an increasingly rare and expensive product in both restaurants and markets.

A primary object of the present invention is to provide an artificially constructed seafood product which has the same natural delicate taste, distinctive texture and nutritional value and yet one which overcomes all of the disadvantages and problems theretofore associated with natural abalone.

Another more specific object of the present invention is to provide a seafood product in which the meat fibers of a more plentiful type of natural seafood animal are broken down in different ways and then reoriented to form a grain structure of the artificial product which closely resembles in both taste and texture that of yet another more expensive type of shellfish, such as abalone.

Still another object of the present invention is to provide a method for making an artificial seafood product which resembles a relatively rare and expensive seafood product and yet is comprised of a more plentiful and less expensive type of natural seafood as well as other ingredients. Once my product has been prepared, even culinary connoisseurs cannot detect the difference between it and natural abalone of the highest quality. Moreover, my product is such that it is difficult, if not impossible, to prepare without having the highest order of good taste and tenderness that would be expected of the best natural abalone prepared in the most skillful manner.

An important factor in the present invention is my discovery that marine bivalve mollusks of the genus Pecten and commonly known as "scallops" could be used to simulate the more expensive meat of abalone. My method provides a manner in which the scallop fibers which are naturally long and arranged in a coarse grainy structure can be broken down and then reoriented to resemble not only the taste but also the grain structure or texture of abalone. In my method, the scallop meat is broken down in essentially two forms, some of it being ground and some with its natural fibers left intact. These meat portions are then recombined with other ingredients to form a mix which closely resembles the conventional abalone steak in both its taste and fiber structure.

Other objects of my invention are to provide an artificial seafood product: that can be made in large bulk quantities from relatively inexpensive shellfish meat and other materials; which can be easily frozen in either bulk form or in subdivided portions for storage shipment and market; and that is relatively easy to prepare, having the best characteristics of the highest quality abalone.

Other objects, advantages and features of the invention will become apparent from the following detailed description presented in conjunction with the accompanying drawing, in which:

FIG. 1 shows a schematic view of the method steps utilized for making my seafood product according to the principles of the invention;

FIG. 2 is a view in perspective and in section showing the typical grain structure of a subdivided portion of my product.

Referring to the drawing, the schematic flow diagram of FIG. 1 illustrates the various method steps used for making my unique seafood product. As shown, the first step of my method is to provide a quantity of natural seafood animal matter in its raw state. In accordance with my invention, for this matter I use only the adductor muscles of the well-known marine bivalve mollusk of the genus Pecten, commonly referred to as scallops. However, several species of this genus Pecten are found in various parts of the sea and can be used in making my product. A characteristic of the edible scallop is that it is comprised of a large number of closely packed and greatly elongated "muscle fibers" which provide a grainy texture. Yet, these adductor muscles or scallops are usually tender, succulent and have a distinctive delicate taste. As will be seen, these realtively long muscle fibers are utilized to help form the new product embodying the features of my invention.

Having provided the raw scallop meat, it is now the next step to divide this meat into two portions which are indicated by the numerals 10 and 12 in the drawing. One portion 10 of the scallops is ground up as in any suitable meat grinder 14 so that they are reduced to a mass of relatively small ground bits 16 of raw scallop material. For this step, I preferred to use a grinder using a head having holes of approximately ⅛" in diameter so that none of the bits are larger than this size.

The remaining portion 12 of scallops are then treated in a manner that causes their relatively long muscle fibers to become shredded and separated from adjoining muscle fibers. This may be done in several ways, such as in a dough mixer 18 or some similar device wherein the scallops are tumbled and beat until their grainy structure is naturally broken apart with their long muscle fibers 20 separated but intact.

In the next step the previously ground portion of scallop meat comprised of small bits 16 and the separated portion of scallop material comprised of the elongated muscle fibers 20 are thoroughly combined together in a suitable container to form a homogeneous mixture 22 of short bits and elongated muscle fibers of scallop material.

After the thorough mixing of the two forms of scallops my next step is to introduce a predetermined quantity of a glutinous material 24 into the mixture. This latter material is preferably pure animal gelatin which is introduced in the dry granular form. A predetermined quantity of gelatin is mixed into the mixed scallop material 22 by feeding it in gradually as continued mixing of the latter occurs.

When the gelatin is thoroughly mixed within the combined scallop portions it dissolves and forms a binding medium in a mixture 26 which serves to hold the mass scallop material together. Later, during storage and when the product is cooked, the gelatin helps to retain and prevent the escape of the natural juices.

At this point, I may add some taste enhancing material to the mixture such as monosodium glutamate, which also may be introduced in the granular form.

I have discovered that the proportions of the aforesaid ingredients of my product are extremely important to its quality. For example, I have found that for best results in providing a product that most closely resembles abalone, the ratio of ground scallop meat to shredded scallop meat should be approximately two to one. Also, the amount of gelatin to be used should be in the range of from 2 to 5% of the total mixture weight with 3 to 4% being preferred.

In one example, the following proportions were used and produced excellent results:

| | Oz. |
|---|---|
| Ground scallops | 55 |
| Shredded scallops | 25 |
| Gelatin | 3 |

After the aforesaid mixing steps have been accomplished, the finally mixed materially 26 can be subdivided into smaller portions 28 of any desired size which become the finished product of my invention. Preferably, it is desirable to make each portion the approximate size and shape of a natural abalone steak. Thus, in a further step of my method each subdivided portion 28, as shown in FIG. 2, is rolled or flattened out to a substantially uniform thickness (e.g., ¼"). When this flattening is done by applying the necessary rolling pressure on a subdivided portion of mixed scallop material and gelatin, a grain structure of the product is formed which causes it to resemble closely in texture that of an actual abalone steak. As illustrated in FIG. 2, the elongated fibers 20 tend to assume a generally horizontal orientation and intertwine while the interstices between them are filled by the ground-up bits 16. Thus, with the help of the gelatin 24 which provides an additional binding effect, a solid product 28 is formed which will maintain its shape while being cooked and have a texture as well as a flavor closely resembling that of a natural abalone steak.

From the foregoing, it should be apparent that the present invention provides a method for making a product that is a unique substitute for a relatively high priced and increasingly rare natural seafood. The success of my product from the culinary standpoint can be attested by the fact that even the most experienced gourmets cannot distinguish it from natural abalone steak when it is prepared in the same manner. Aside from this, and the fact that the cost of my product is far less than the natural abalone which it replaces, there are other important advantages which greatly increase its commercial value.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for making a seafood product having a taste and texture resembling that of an abalone and comprising the steps of:

providing a quantity of adductor muscles from marine bivalve mollusks of the genus Pecten, and dividing them into two portions;

grinding a first portion of said muscles so that the normally long muscle fibers thereof are formed into relatively small particles;

shredding the remaining portion of said muscles so that most of the relatively long natural muscle fibers thereof are separated;

mixing the said two portions of muscles together so that the ground particles are interspersed between the relatively long muscle fibers;

and adding a quantity of glutinous material into said two-portion mixture until it is distributed evenly therein.

2. The method as described in claim 1 wherein said glutinous material is pure animal gelatin in a dry granular form.

3. The method as described in claim 1 wherein the ratio of said first portion of muscles to said second portion is approximately 2 to 1 and said glutinous material is animal gelatin comprising from 2 to 5% by weight of the total mixture.

4. The method as described in claim 1 including a further step of subdividing said mixture into smaller portions and applying pressure on each to flatten said portion into a steak-like product having a substantially uniform thickness in which said long fibers are oriented generally parallel to the plane of said product with said ground particles interspersed between said long fibers.

5. A seafood product which simulates natural abalone comprising in combination a first quantity of ground-up, short particles of scallop material and a second quantity of relatively long shredded scallop fibers, said quantities being mixed together in a homogeneous mass, and a quantity of gelatin material uniformly distributed throughout the product and forming a binding medium for the scallop material.

6. The product as described in claim 5 which contains approximately twice as much of said ground scallop material as said shredded scallop material and wherein said gelatin comprises from 2 to 5% of the total weight of the product.

7. The product as described in claim 6 wherein said mass is formed in a generally flat steak-like product of substantially uniform thickness in which said long scallop fibers are intertwined with said short particles of scallop material interspersed between the fibers, thereby forming with said gelatin material a texture simulating that of natural abalone.

References Cited

UNITED STATES PATENTS

| | | | |
|---|---|---|---|
| 3,301,686 | 1/1967 | Bacon | 99—111 |
| 3,253,931 | 5/1966 | Coleman et al. | 99—18 |
| 3,173,795 | 3/1965 | Torr | 99—108 |

A. LOUIS MONACELL, Primary Examiner

R. M. ELLIOTT, Assistant Examiner